US011003613B2

(12) United States Patent
Escamilla et al.

(10) Patent No.: US 11,003,613 B2
(45) Date of Patent: May 11, 2021

(54) EJECT PULL MECHANISM FOR INFORMATION HANDLING SYSTEM

(71) Applicant: DELL PRODUCTS, LP, Round Rock, TX (US)

(72) Inventors: Eduardo Escamilla, Round Rock, TX (US); Bernard D. Strmiska, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/578,932

(22) Filed: Sep. 23, 2019

(65) Prior Publication Data

US 2021/0089485 A1    Mar. 25, 2021

(51) Int. Cl.
*G06F 13/40* (2006.01)
(52) U.S. Cl.
CPC ................... *G06F 13/409* (2013.01)
(58) Field of Classification Search
CPC ............................. G06F 13/00; G06F 13/409
USPC ................................ 710/301–306; 713/324
See application file for complete search history.

(56) References Cited

U.S. PATENT DOCUMENTS

| 7,086,721 B2 | 8/2006 | Silverbrook et al. |
| 7,400,499 B2 | 7/2008 | Mundt et al. |
| 8,634,189 B2 | 1/2014 | Escamilla et al. |
| 2001/0005644 A1* | 6/2001 | Hashimoto ........ G06K 13/0806 439/159 |
| 2005/0135910 A1 | 6/2005 | Pruteanu et al. |
| 2006/0054698 A1* | 3/2006 | Lev ...................... H05K 5/0282 235/441 |

OTHER PUBLICATIONS

"OCP NIC 3.0 Design Specification; Version 0.91," OCP Server Workgroup, OCP NIC subgroup, Open Compute Project, OCP Mezz NIC; pp. 1-202; http://www.opencompute.org/wiki/Server/Mezz.

* cited by examiner

*Primary Examiner* — Tim T Vo
*Assistant Examiner* — Kim T Huynh
(74) *Attorney, Agent, or Firm* — Larson Newman, LLP

(57) ABSTRACT

An Open Compute Project (OCP) module forces an electrical shutdown sequence. The OCP module integrates an eject pull mechanism that has two (2) positions. A retracted position of the two (2) positions is inaccessible from an exterior of an information handling system. A deployed position of the two (2) positions is only accessible from an interior of the information handling system. The eject pull mechanism forces the electrical shutdown sequence prior to moving or transitioning from the retracted position to the deployed position.

11 Claims, 8 Drawing Sheets

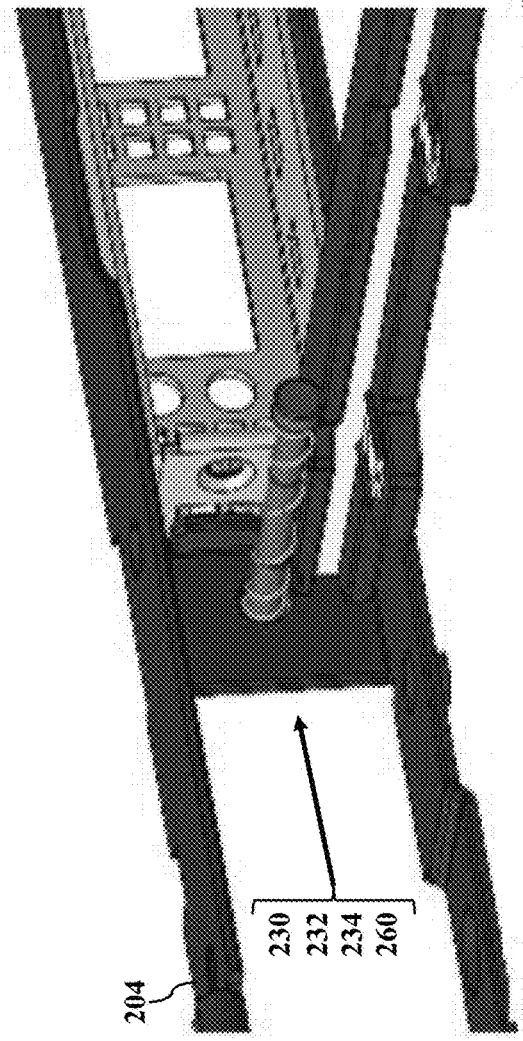
*FIG. 6A*
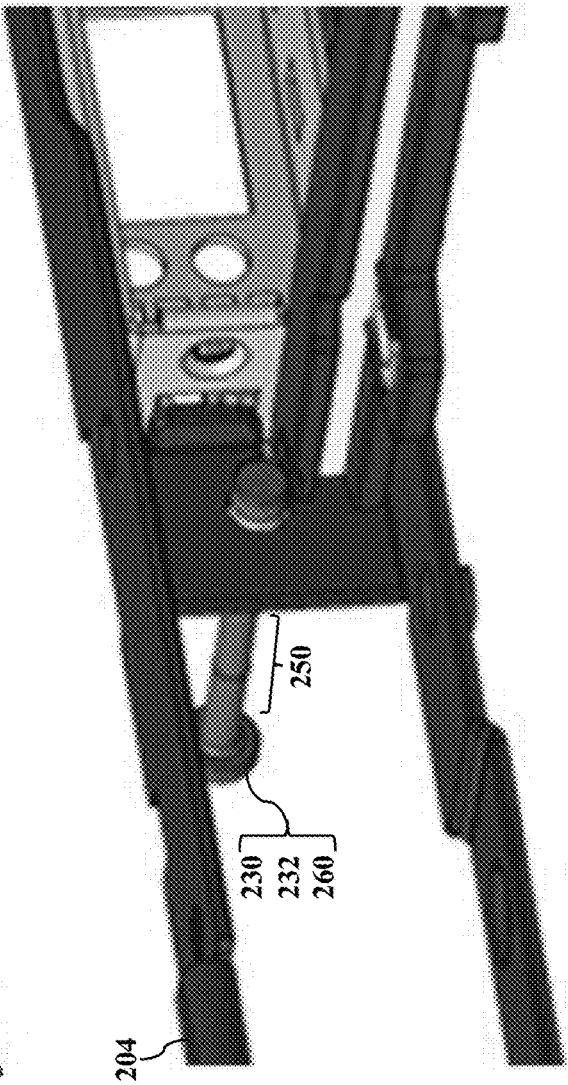
*FIG. 6B*
*FIG. 6*

EJECT PULL MECHANISM FOR INFORMATION HANDLING SYSTEM

CROSS-REFERENCE TO RELATED APPLICATION

Related subject matter is contained in co-pending U.S. patent application Ser. No. 16/507,554 entitled "Apparatus and Method for Controlled Ejection of an Open Compute Project Module from an Information Handling System," filed Jul. 10, 2019, the disclosure of which is hereby incorporated by reference.

FIELD OF THE DISCLOSURE

This disclosure generally relates to information handling systems, and more particularly relates to forced shutdown prior to ejecting peripheral modules.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system includes a peripheral interface and a frame that is operable to receive an Open Compute Project (OCP) module. The information handling system also includes an eject pull mechanism for ejecting the OCP module from the frame. The eject pull mechanism has features that force a technician or engineer to formally shutdown down the information handling system prior to removing the OCP module. The eject pull mechanism thus forces a user to perform a formal shutdown sequence prior to removing the OCP module (such as a forced cold swap).

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIGS. 4-6 illustrate an eject pull mechanism, according to exemplary embodiments.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
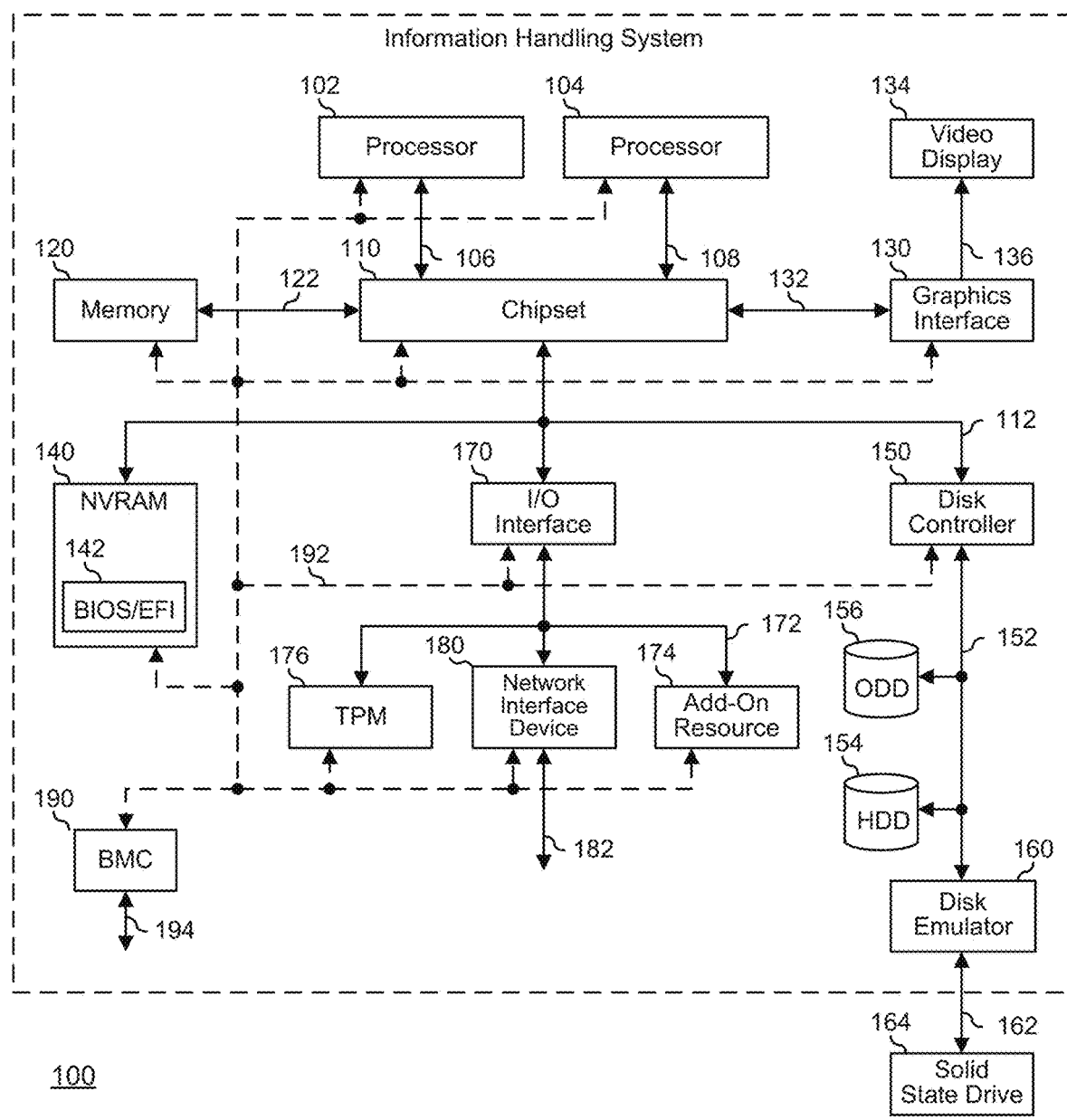
FIG. 1 is a block diagram of a generalized information handling system.

FIG. 1 illustrates an embodiment of an information handling system 100 including processors 102 and 104, chipset 110, memory 120, graphics adapter 130 connected to video display 134, non-volatile RAM (NV-RAM) 140 that includes a basic input and output system/extensible firmware interface (BIOS/EFI) module 142, disk controller 150, hard disk drive (HDD) 154, optical disk drive (ODD) 156, disk emulator 160 connected to solid state drive (SSD) 164, an input/output (I/O) interface 170 connected to an add-on resource 174, a trusted platform module (TPM) 176, a network interface device 180, and a baseboard management controller (BMC) 190. Processor 102 is connected to chipset 110 via processor interface 106, and processor 104 is connected to chipset 110 via processor interface 108.

Chipset 110 represents an integrated circuit or group of integrated circuits that manages data flow between processors 102 and 104 and the other elements of information handling system 100. In a particular embodiment, chipset 110 represents a pair of integrated circuits, such as a north bridge component and a south bridge component. In another embodiment, some or all of the functions and features of chipset 110 are integrated with one or more of processors 102 and 104. Memory 120 is connected to chipset 110 via a memory interface 122. An example of memory interface 122 includes a Double Data Rate (DDR) memory channel, and memory 120 represents one or more DDR Dual In-Line Memory Modules (DIMMs). In a particular embodiment, memory interface 122 represents two or more DDR channels. In another embodiment, one or more of processors 102 and 104 include memory interface 122 that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like.

Graphics adapter 130 is connected to chipset 110 via a graphics interface 132, and provides a video display output 136 to a video display 134. An example of a graphics interface 132 includes a peripheral component interconnect-express interface (PCIe) and graphics adapter 130 can include a four lane (×4) PCIe adapter, an eight lane (×8)

PCIe adapter, a 16-lane (×16) PCIe adapter, or another configuration, as needed or desired. In a particular embodiment, graphics adapter 130 is provided on a system printed circuit board (PCB). Video display output 136 can include a digital video interface (DVI), a high definition multimedia interface (HDMI), DisplayPort interface, or the like. Video display 134 can include a monitor, a smart television, an embedded display such as a laptop computer display, or the like.

NV-RAM 140, disk controller 150, and I/O interface 170 are connected to chipset 110 via I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller 150 to HDD 154, to ODD 156, and to disk emulator 160. Disk interface 152 may include an integrated drive electronics (IDE) interface, an advanced technology attachment (ATA) such as a parallel ATA (PATA) interface or a serial ATA (SATA) interface, a SCSI interface, a USB interface, a proprietary interface, or a combination thereof. Disk emulator 160 permits a solid-state drive (SSD) 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects I/O interface 170 to add-on resource 174, to TPM 176, and to network interface device 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a sound card, data storage system, an additional graphics interface, another add-on resource, or a combination thereof. Add-on resource 174 can be on a main circuit board, a separate circuit board or an add-in card disposed within information handling system 100, a device that is external to the information handling system, or a combination thereof.

Network interface device 180 represents a network communication device disposed within information handling system 100, on a main circuit board of the information handling system, integrated onto another element such as chipset 110, in another suitable location, or a combination thereof. Network interface device 180 includes a network channel 182 that provides an interface to devices that are external to information handling system 100. In a particular embodiment, network channel 182 is of a different type than peripheral channel 172 and network interface device 180 translates information from a format suitable to the peripheral channel to a format suitable to external devices. In a particular embodiment, network interface device 180 includes a host bus adapter (HBA), a host channel adapter, a network interface card (NIC), or other hardware circuit that can connect the information handling system to a network. An example of network channel 182 includes an InfiniBand channel, a fiber channel, a gigabit Ethernet channel, a proprietary channel architecture, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processors 102 and 104, which provides various management functions for information handling system 100. In an embodiment, BMC 190 may be responsible for granting access to a remote management system that may establish control of the elements to implement power management, cooling management, storage management, and the like. The BMC 190 may also grant access to an external device. In this case, the BMC may include transceiver circuitry to establish wireless communications with the external device such as a mobile device. The transceiver circuitry may operate on a Wi-Fi channel, a near-field communication (NFC) channel, a Bluetooth or Bluetooth-Low-Energy (BLE) channel, a cellular based interface such as a global system for mobile (GSM) interface, a code-division multiple access (CDMA) interface, a universal mobile telecommunications system (UMTS) interface, a long-term evolution (LTE) interface, another cellular based interface, or a combination thereof. A mobile device may include Ultrabook, a tablet computer, a netbook, a notebook computer, a laptop computer, mobile telephone, a cellular telephone, a smartphone, a personal digital assistant, a multimedia playback device, a digital music player, a digital video player, a navigational device, a digital camera, and the like.

The term BMC may be used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller, and embedded controllers included at the blades of the blade server can be referred to as blade management controllers. Out-of-band communication interfaces between BMC and elements of the information handling system may be provided by management interface 192 that may include an inter-integrated circuit (I2C) bus, a system management bus (SMBUS), a power management bus (PMBUS), a low pin count (LPC) interface, a serial bus such as a universal serial bus (USB) or a serial peripheral interface (SPI), a network interface such as an Ethernet interface, a high-speed serial data link such as PCIe interface, a network controller-sideband interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

In an embodiment, the BMC 190 implements an integrated remote access controller (iDRAC) that operates to monitor and maintain system firmware, such as code stored in BIOS/EFI module 142, option ROMs for graphics interface 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as Web Services Management (WS-MAN) interface, a Management Component Transport Protocol (MCTP) or, Redfish interface), various vendor defined interfaces (such as Dell EMC Remote Access Controller Administrator (RACADM) utility, Dell EMC Open Manage Server Administrator (OMSS) utility, Dell EMC Open Manage Storage Services (OMSS) utility, Dell EMC Open Manage Deployment Toolkit (DTK) suite), representational state transfer (REST) web API, a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100, or is integrated into another element of the information handling system such as chipset 110, or another suitable element, as needed or desired. As such, BMC 190 can be part of an integrated circuit or a chip set within information handling system 100. BMC 190 may operate on a separate power plane from other resources in information handling system 100. Thus BMC 190 can communicate with the remote management system via network interface 194 or the BMC can communicate with the external mobile device using its own transceiver circuitry while the resources or elements of information handling system 100 are powered off or at least in low power mode. Here, information can be sent from the remote management system or external mobile device to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

In a typical usage case, information handling system 100 represents an enterprise class processing system, such as may be found in a datacenter or other compute-intense processing environment. Here, there may be hundreds or thousands of other enterprise class processing systems in the datacenter. In such an environment, the information handling system may represent one of a wide variety of different types of equipment that perform the main processing tasks of the datacenter, such as modular blade servers, switching and routing equipment (network routers, top-of-rack switches, and the like), data storage equipment (storage servers, network attached storage, storage area networks, and the like), or other computing equipment that the datacenter uses to perform the processing tasks.

Open Compute Project (OCP) is an organization that promotes efficient hardware designs for scalable computing. The OCP has proposed a server project that provides standardized system specifications. One of these specifications includes an OCP module having defined locations of notches along its outer perimeter. The OCP module may include a peripheral card such as the NIC that can be installed or removed from the information handling system. Further information may be found in OCP NIC 3.0 specification at www.opencompute.org/documents, which is incorporated herein by reference in its entirety. This particular hardware configuration can be improved by leveraging the defined locations of the notches in the OCP module as described below.

Figure 2:
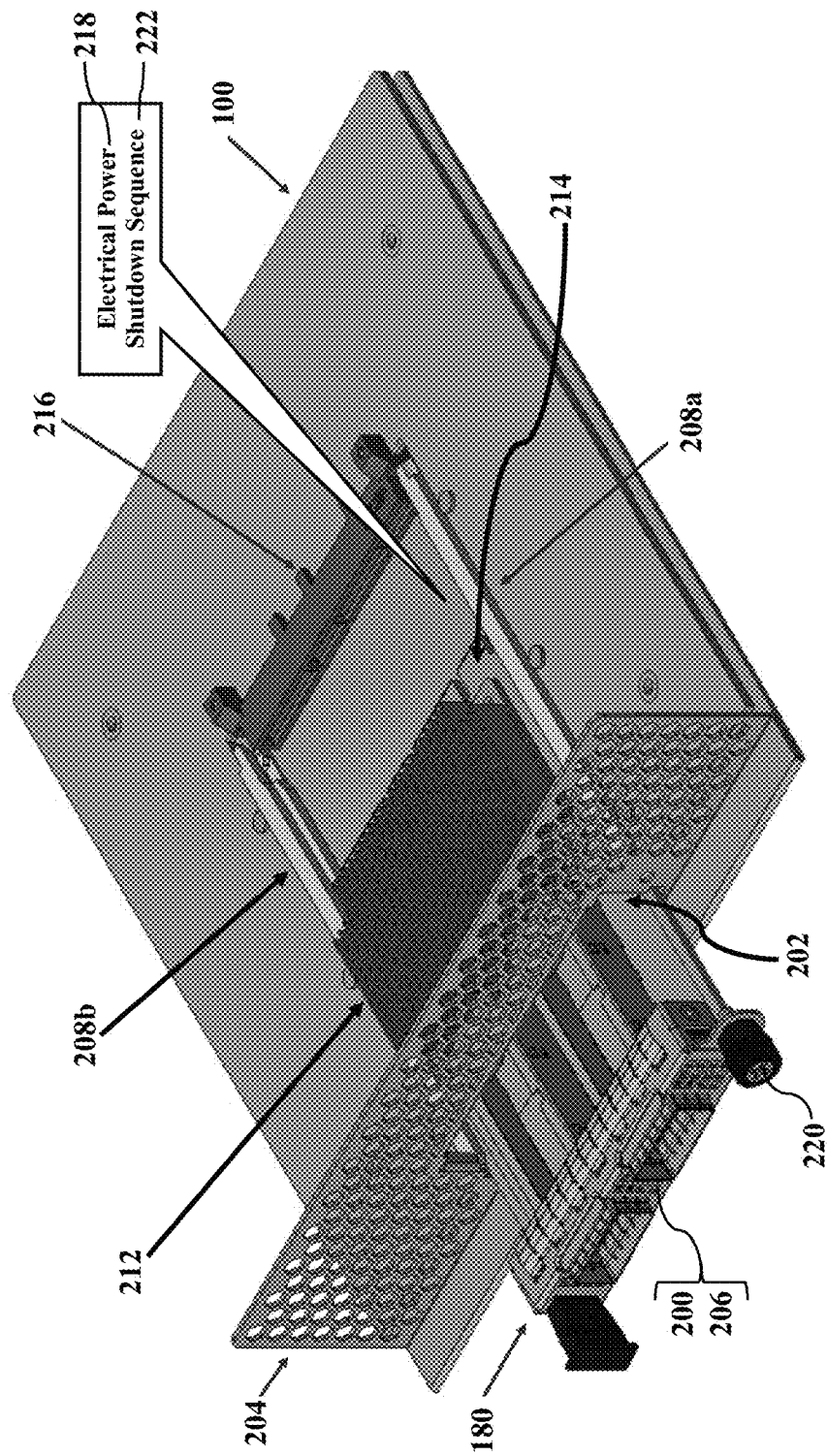
FIGS. 2 and 3 are simplified illustrations of a conventional mechanical implementation of an OCP module 200 (such as the network interface device or NIC 180), according to the OCP NIC 3.0 specification.
Figure 3:
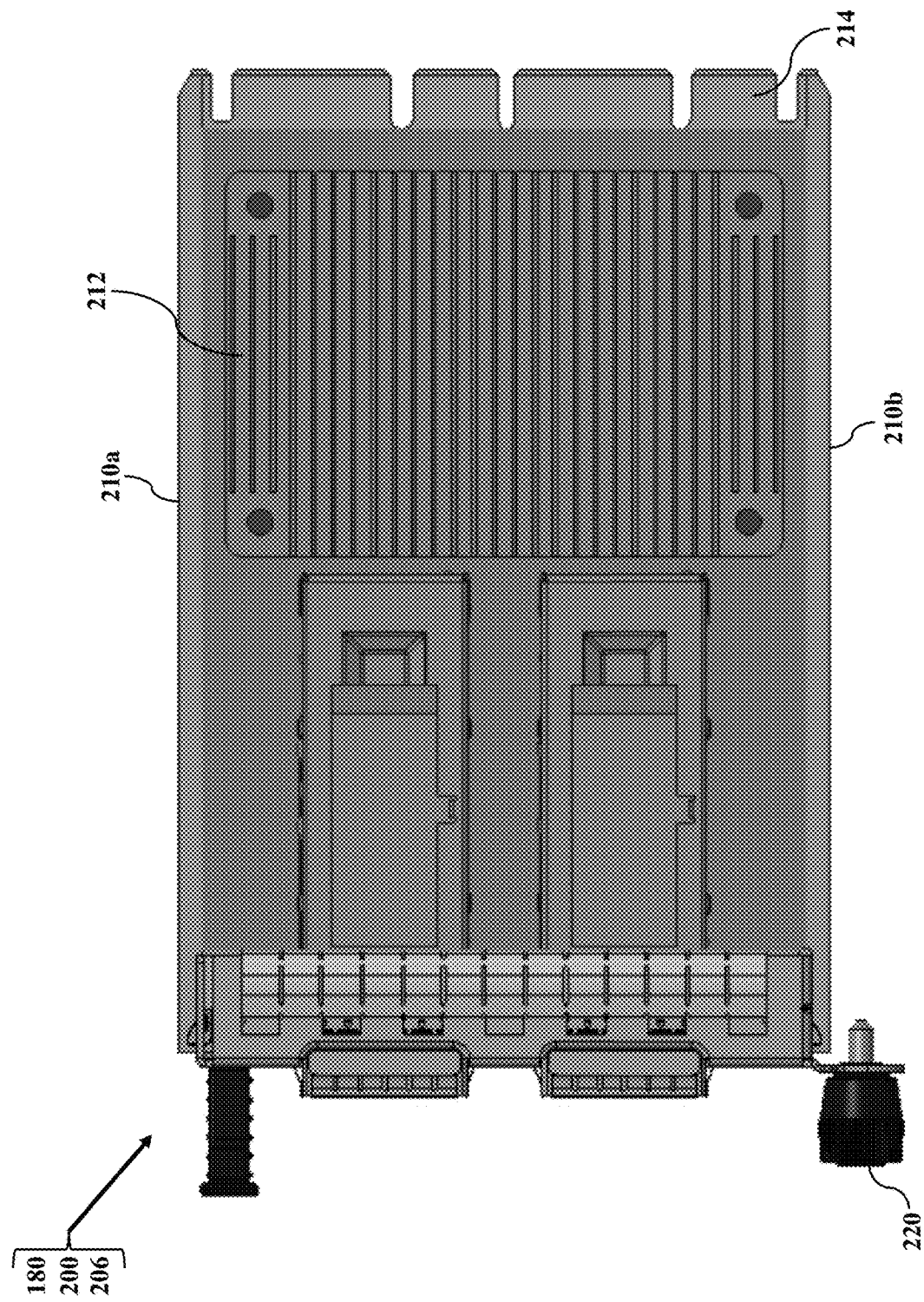

FIGS. 2-3 are simplified illustrations of a conventional mechanical implementation of an OCP module 200 (such as the network interface device or NIC 180), according to the OCP NIC 3.0 specification. The OCP module 200 may be inserted into, and withdrawn from, an opening or window 202 within a chassis panel or face 204 of the information handling system 100. FIG. 2, in particular, illustrates the OCP module 200 as a peripheral adapter card 206 that perpendicularly slides (to the chassis panel or face 204) within guides 208*a* and 208*b*. FIG. 3 illustrates side rails 210*a* and 210*b* (of the module 200) that respectively insert into, and slide along, the guides 208*a* and 208*b*. The OCP module 200 has many electronic components 212 that are soldered/mounted to a printed circuit board (not shown for simplicity) of the peripheral adapter card 206 (such as processor, memory device(s), heat sink, physical RJ45/56 Ethernet jacks, and optical transceiver sockets). The OCP module 200 also has an electrical connector 214 that mates with a straddle connector 216 in a male/female relationship. When the OCP module 200 is fully inserted (along the guides 208*a* and 208*b*) into the information handling system 100, the electrical connector 214 mates with the straddle connector 216 to receive an electrical power 218. When the OCP module 200 is at least partially withdrawn from within the information handling system 100, the electrical connector 214 disconnects from the straddle connector 216 and the electrical power 218 is disconnected and removed. A thumb screw 220 secures the network interface device 180 to the chassis panel or face 204 of the information handling system 100. Because the mechanical features of the OCP NIC 3.0 specification are well known and incorporated herein by reference in their entirety, this disclosure need not dwell on the known aspects.

As the reader may now realize, the conventional mechanical implementation can be unsafe. Ordinarily, the information handling system 100 should undergo a formal shutdown sequence 222 prior to removing the network interface device 180. As the reader may understand, the formal shutdown sequence 222 may require a "Shut Down" selection from a menu or window (or Ctrl+Alt+Del, Alt+4, etc.). Notice, though, that the mechanical implementation of the OCP NIC 3.0 specification permits a human user to release the network interface device 180 prior to electrical shut down. That is, a technician or engineer may turn or loosen the thumb screw 220 from the chassis panel or face 204, thus allowing the network interface device 180 to be removed (or pop out, perhaps due to spring loading) from the information handling system 100 without first performing the formal shutdown sequence 222. Recall that when the network interface device 180 is at least partially withdrawn from within the information handling system 100, the electrical connector 214 disconnects from the straddle connector 216 and the electrical power 218 is lost. If the technician or engineer did not first perform the formal shutdown sequence 222, then the performance of the network interface device 180 may be compromised (due to a so-called "hot swap" attempt on a non-hot plug or cold swap device).

Figure 4:
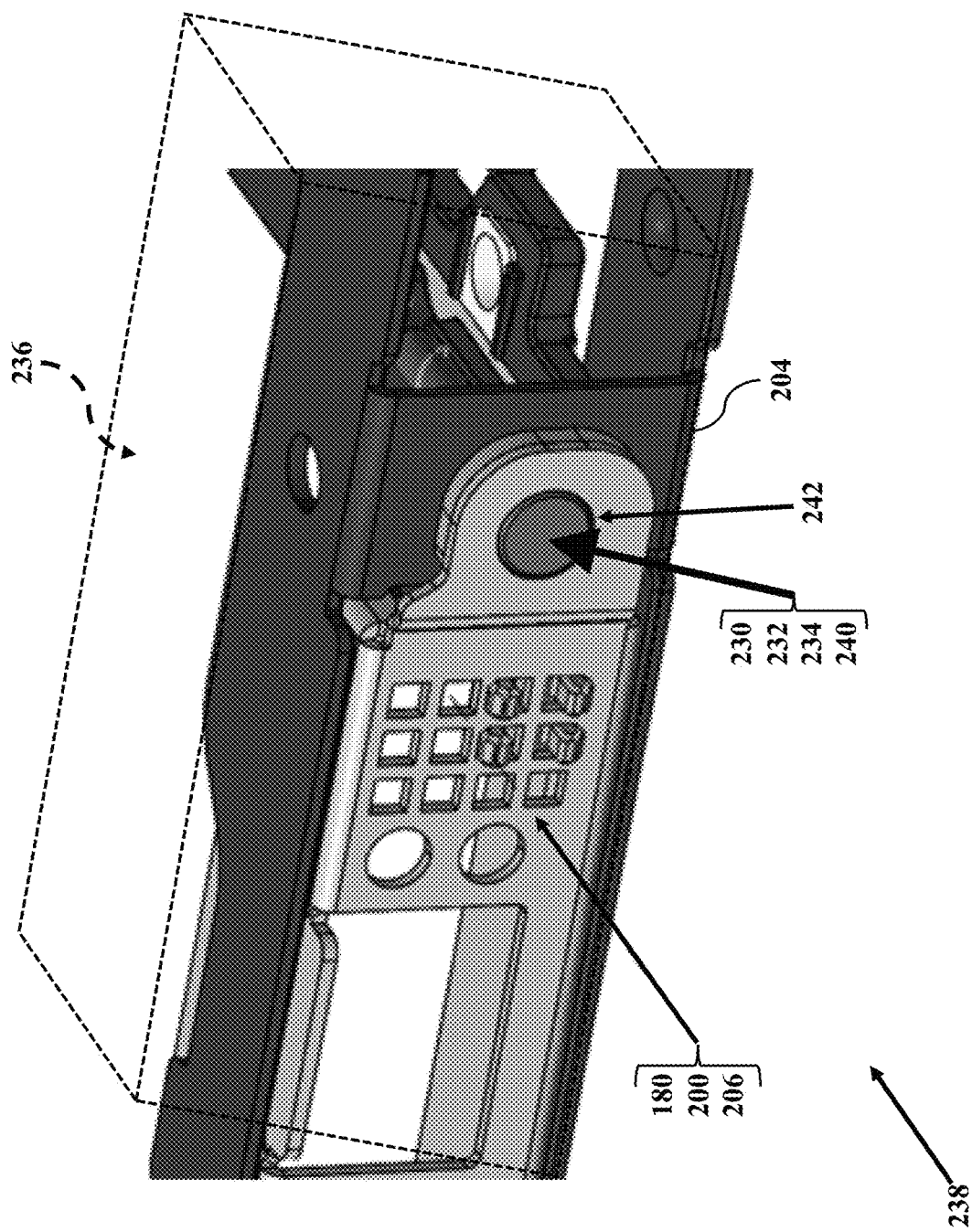
Figure 5:
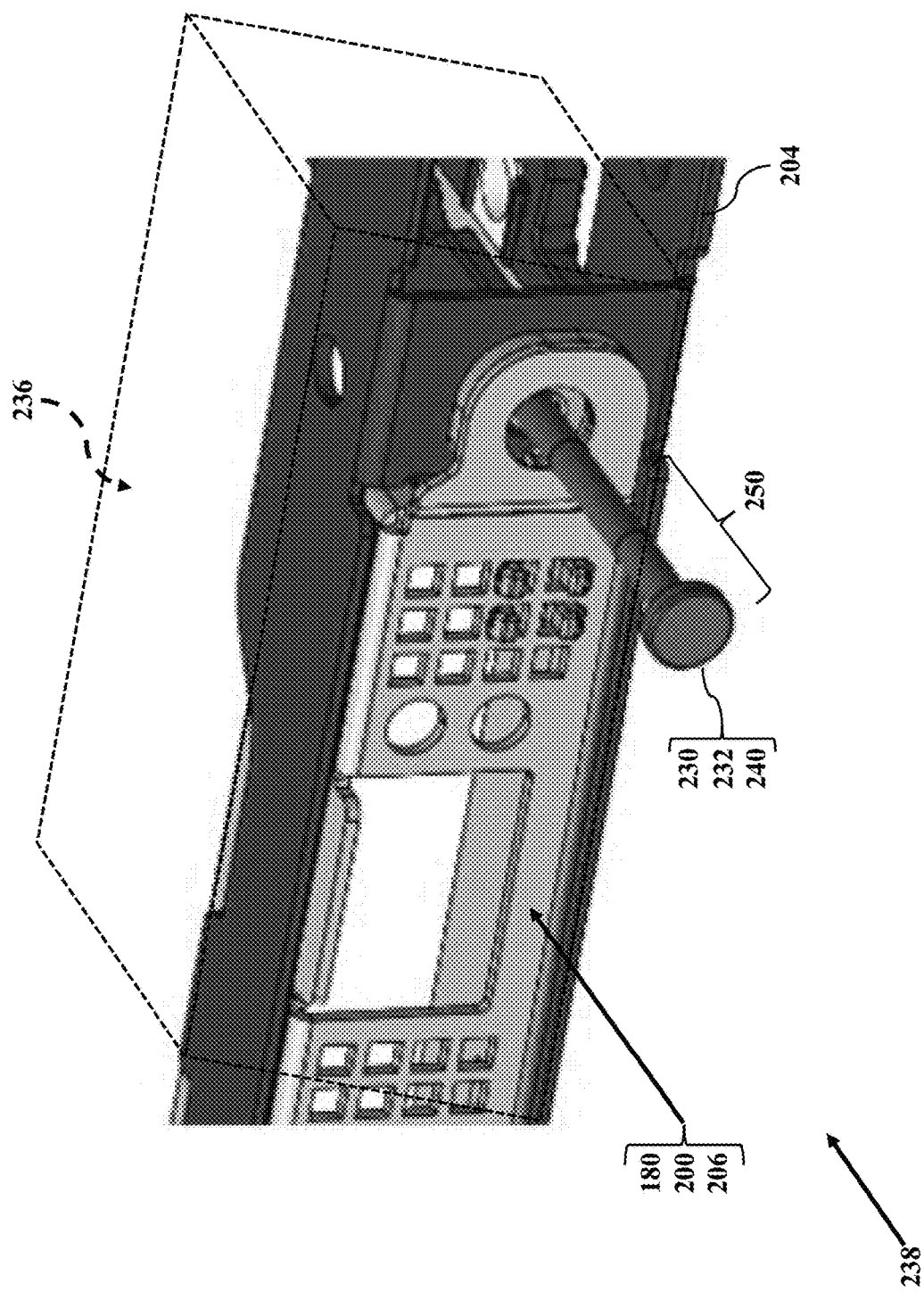

FIGS. 4-6 illustrate an eject pull mechanism 230, according to exemplary embodiments. The eject pull mechanism 230 allows the technician or engineer to eject the network interface device 180 from the information handling system 100 (illustrated in FIGS. 1-3). However, the eject pull mechanism 230 forces the technician or engineer to formally shutdown down the information handling system 100 prior to removing the network interface device 180. The eject pull mechanism 230 is thus an integrated removal provision for any non-hot pluggable device (such as the network interface device 180). The eject pull mechanism 230 prevents the network interface device 180 from being removed from an outside of the information handling system 100 without first performing the formal shutdown sequence (illustrated as reference numeral 222 in FIG. 2). The eject pull mechanism 230 also prevents the technician or engineer from pushing on physical connectors or other components (such as the heatsink) when removing the network interface device 180. The eject pull mechanism 230 is easy to operate and permits a controlled removal of the network interface device 180.

The eject pull mechanism 230 incorporates a pull shaft 232. The eject pull mechanism 230 removes the thumb screw (illustrated as reference numeral 220 in FIGS. 2-3) and, instead, utilizes the pull shaft 232. The pull shaft 232 is mechanically connected to the OCP module 200. When the user wishes to remove or eject the OCP module 200, the user grasps and outwardly pulls the pull shaft 232. The eject pull mechanism 230, however, has primarily two (2) positions. As FIG. 4 best illustrates, the eject pull mechanism 230 may have a retracted position 234. The pull shaft 232, when retracted into the interior 236 of the information handling system 100, is inaccessible from the outside 238 of the information handling system 100. That is, the pull shaft 232 has a head or knob 240 that is arranged to be sub-flush 242 to the chassis panel or face 204. Because the pull shaft 232 does not protrude beyond the chassis panel or face 204 in the retracted position 234, the technician or engineer is unable to grasp the pull shaft 232 to remove the OCP module 200. Because the pull shaft 232 is in its retracted position 234, the user may only internally access the pull shaft 232 from the interior 236 of the information handling system 100. That is, in order to deploy or extend the pull shaft 232, the user must insert her/his hand into the interior 236 of the information handling system 100. Because safety procedures require that the information handling system 100 be formally shut down prior to interior access (to prevent electrical shock), the eject pull mechanism 230 forces the technician or engineer to first perform the formal shutdown sequence (illustrated as reference numeral 222 in FIG. 2) prior to accessing the pull shaft 232.

As FIG. 5 best illustrates, the eject pull mechanism 230 may have a deployed position 250. After the user performs the formal shutdown sequence (illustrated as reference numeral 222 in FIG. 2), the user may access the pull shaft 232 from within the interior 236 of the information handling system 100. The technician or engineer, for example, may push a back end (not shown for simplicity) of the pull shaft 232, thus extending the head or knob 240 beyond the chassis panel or face 204. The technician or engineer may thus grasp the head or knob 240 and pull the OCP module 200 from the information handling system 100.

FIG. 6 illustrates interior views of the two (2) positions of the eject pull mechanism 230. FIG. 6A, for example, illustrates the retracted position 234 in which the pull shaft 232 is retracted into the interior of the information handling system (shown, respectively, as reference numerals 236 and 100 in FIGS. 1-5). The pull shaft 232 has a spring mechanism 260 that exerts a longitudinal extending force between a backside of the chassis panel or face 204 and a back end of the pull shaft 232. The spring mechanism 260 fully extends the pull shaft 232 within the information handling system 100, thus keeping the pull shaft 232 retracted from exterior access. FIG. 6B illustrates the deployed position 250 in which the pull shaft 232 is extended beyond the chassis panel or face 204 of the information handling system 100. After the user performs the formal shutdown sequence (illustrated as reference numeral 222 in FIG. 2), the user may access the pull shaft 232 from within the interior 236 of the information handling system 100. The technician or engineer, for example, may push the back end of the pull shaft 232, thus compressing the spring mechanism 260 and causing the pull shaft 232 to extend or protrude beyond the chassis panel or face 204. The technician or engineer may thus grasp the head or knob 240 and pull the OCP module 200 from the information handling system 100.

Exemplary embodiments present an elegant solution. The eject pull mechanism 230 replaces the existing thumb screw 220 mechanism of the OCP NIC 3.0 specification. The eject pull mechanism 230 forces the user to perform the formal shutdown sequence 222 prior to removing the OCP module 200 (e.g., forced cold swap). The eject pull mechanism 230 thus forces the formal shutdown sequence 222 prior to the deployed position 250. The eject pull mechanism 230, in other words, cannot transition from the retracted position 234 to the deployed position 250 without first performing the formal shutdown sequence 222 that safely shuts down the OCP module 200 and removes the electrical power 218. The eject pull mechanism 230 provides an intuitive touch point for controlled removal, even in spite of the drop in force after connector unmate. The eject pull mechanism 230 is arranged within a small, unused volume adjacent to the OCP module 200 and utilizes no more space than the current latch solution. The eject pull mechanism 230 provides the user/operator a method of ejection without touching the components 212 of the OCP module 200. As a further safety precaution, the spring mechanism 260 causes the pull shaft 232 to always return to the retracted position 234 (e.g., non-service, interiorly stowed position).

Figure 7:
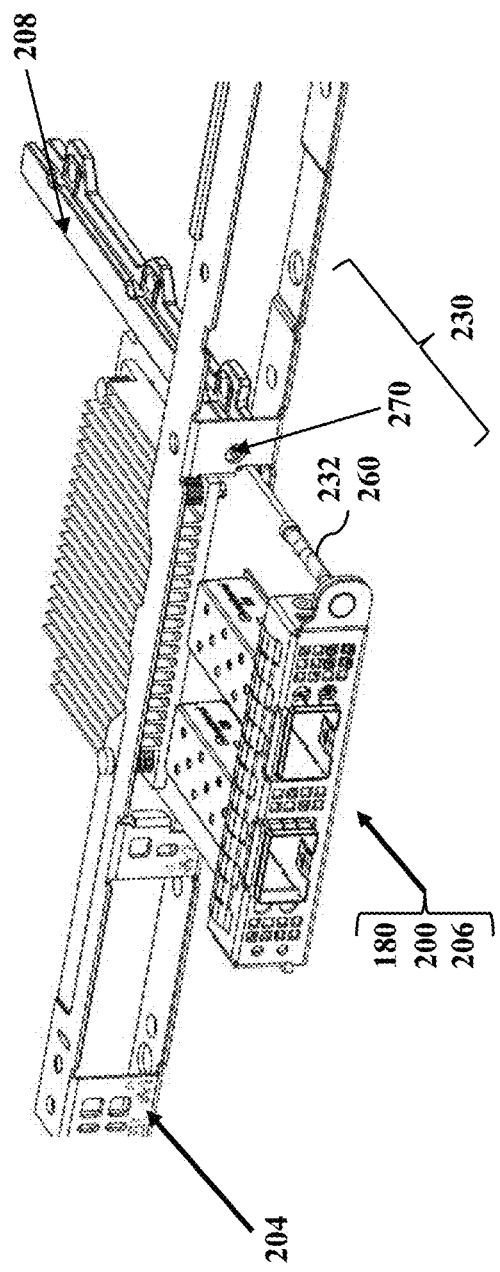
FIGS. 7-8 illustrate further details of the eject pull mechanism, according to exemplary embodiments.
Figure 8:
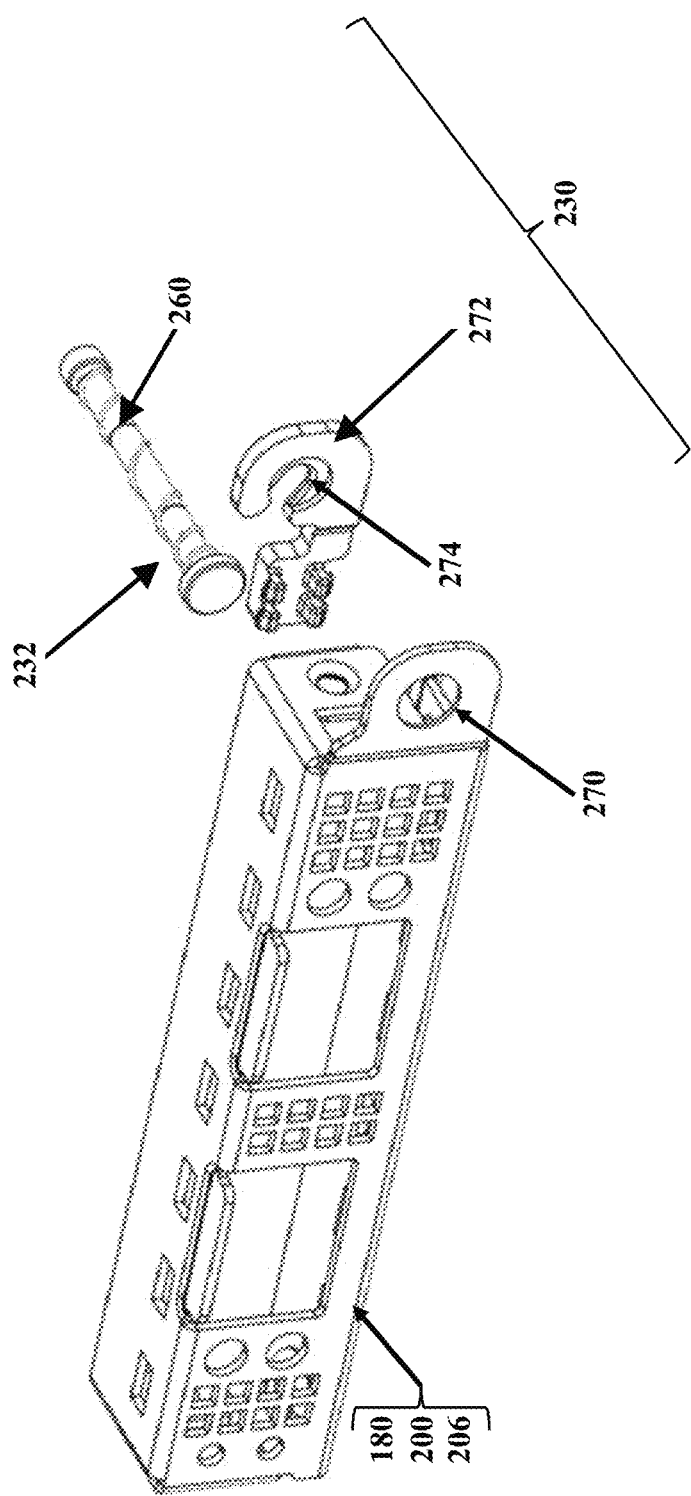

FIGS. 7-8 illustrate further details of the eject pull mechanism 230, according to exemplary embodiments. The pull shaft 232 stows within the area/volume of the existing guides (illustrated as reference numerals 208a and 208b in FIG. 2) and out of the way of the OCP module 200 and other server components the information handling system 100. The eject pull mechanism 230 is inexpensive, simple and provides a controlled and intuitive way to remove the OCP module 200 without risking component damage. The eject pull mechanism 230 utilizes a hole, aperture, or passage 270 (perhaps punched or drilled in the chassis panel or face 204) through which the pull shaft 232 longitudinally traverses/slides. The hole, aperture, or passage 270 is sized relative to a diameter of the pull shaft 232, perhaps for a slip fit. As FIG. 8 further illustrates, a backside or rearward holder 272 may be added as an additional guide/support for the pull shaft 232. While the holder 272 may have any shape or configuration, FIG. 8 illustrates a hook-shape that permits snap insertion of the pull shaft 232 into the holder 272. The holder 272 has an opening 274 that is sized relative to the diameter of the pull shaft 232.

Exemplary embodiments may be applied to any peripheral device. While this disclosure mostly explains the OCP module 200 configured according to the OCP NIC 3.0 specification, the eject pull mechanism 230 may be adapted to any modular component that is horizontally installed/removed from the sides/front/rear of the information handling system 100.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An open compute project module for an information handling system, comprising:
    an electronic component installed to a peripheral adapter card of the open compute project module; and
    an eject pull mechanism integrated with the open compute project module, the eject pull mechanism comprising a pull shaft having two (2) positions, a retracted position of the two (2) positions having the pull shaft longitudinally retracted within an interior of the information handling system and being inaccessible from an exterior of the information handling system, and a deployed position of the two (2) positions that forces an electrical shutdown of the information handling system prior to accessing and longitudinally extending the pull shaft from the interior of the information handling system.

2. The open compute project module of claim 1, wherein the eject pull mechanism mechanically connects the pull shaft mechanically to the open compute project module.

3. The open compute project module of claim 1, wherein the eject pull mechanism retracts the pull shaft to the retracted position.

4. The open compute project module of claim 3, wherein the eject pull mechanism comprises a spring mechanism that retracts the pull shaft within the interior of the information handling system.

5. The open compute project module of claim 1, wherein the eject pull mechanism comprises a spring mechanism that retains the retracted position of the two (2) positions.

6. An information handling system, comprising:
    a hardware processor;
    a memory device;
    a network interface card configured as an open compute module; and
    an eject pull mechanism integrated with the network interface card configured as the open compute module, the eject pull mechanism comprising a pull shaft having two (2) positions, a retracted position of the two (2) positions having the pull shaft retracted within an interior of the information handling system and being inaccessible from an exterior of the information handling system, and a deployed position of the two (2) positions that forces an electrical shutdown of the information handling system prior to accessing and extending the pull shaft from the interior of the information handling system.

7. The information handling system of claim 6, wherein the eject pull mechanism mechanically connects the pull shaft to the network interface card configured as the open compute module.

8. The information handling system of claim 6, wherein the eject pull mechanism retracts the pull shaft within the information handling system to the retracted position.

9. The information handling system of claim 8, wherein the eject pull mechanism comprises a spring mechanism that retracts the pull shaft within the interior of the information handling system.

10. The information handling system of claim 6, wherein the eject pull mechanism comprises a spring mechanism that exerts a longitudinal extending force between a backside of a chassis panel and a back end of the pull shaft.

11. A network interface card configured as an open compute project module for an information handling system, comprising:
    an electronic component installed to the network interface card configured as the open compute module; and
    an eject pull mechanism mechanically connected to the network interface card configured as the open compute module, the eject pull mechanism comprising a pull shaft having two (2) positions, a retracted position of the two (2) positions having the pull shaft retracted within an interior of the information handling system and being inaccessible from an exterior of the information handling system, and a deployed position of the two (2) positions that forces an electrical shutdown of the information handling system prior to accessing and extending the pull shaft from the interior of the information handling system.

* * * * *